Feb. 17, 1959 R. C. WOLF ET AL 2,873,878
SEALS FOR PRESSURE VESSELS
Filed April 4, 1957
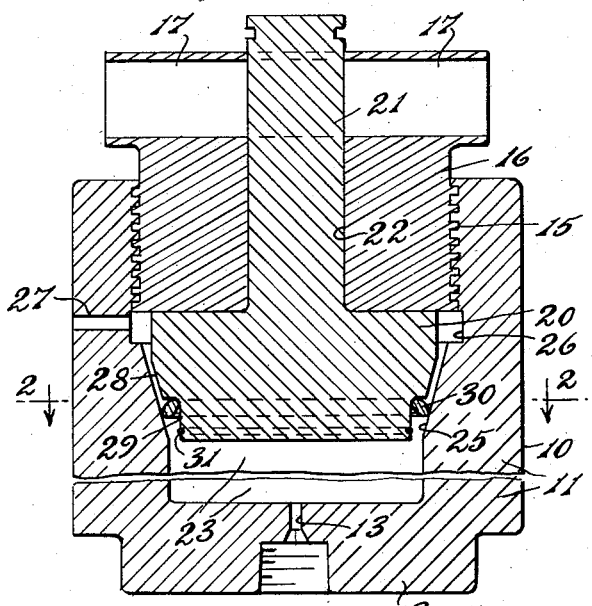
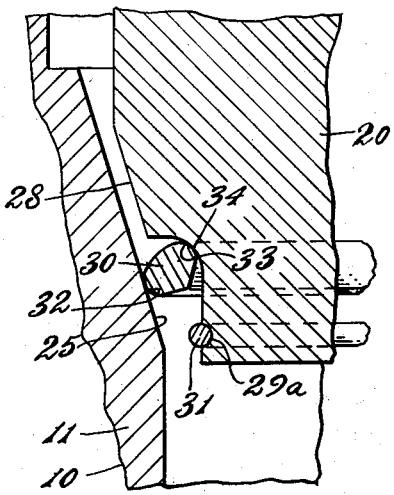
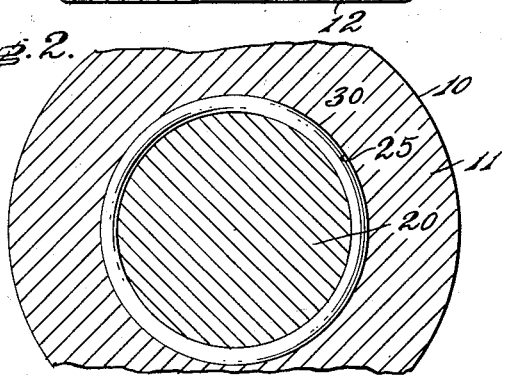
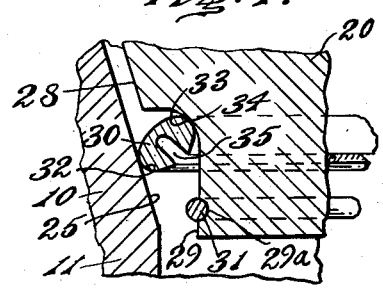
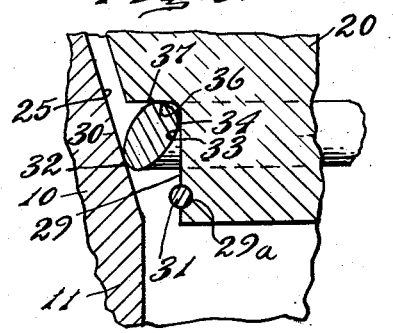
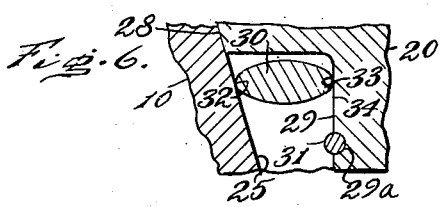
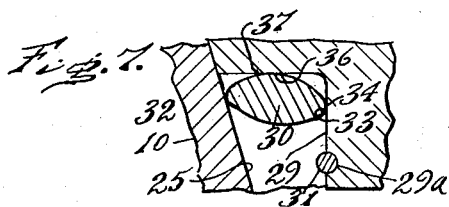
INVENTORS
Robert C. Wolf
John C. Bowen
BY
ATTORNEY

# United States Patent Office 2,873,878
Patented Feb. 17, 1959

2,873,878

SEALS FOR PRESSURE VESSELS

Robert C. Wolf, Hatboro, and John C. Bowen, Davisville, Pa., assignors to Pressure Products Industries, Inc., Hatboro, Pa., a corporation of Pennsylvania Application April 4, 1957, Serial No. 650,729

8 Claims. (Cl. 220—46)

This invention relates to seals for pressure vessels and more particularly to seals for such vessels in which the internal pressures can range from zero p. s. i. to fifty thousand p. s. i., or higher.

Various seals have heretofore been proposed for pressure vessels but none of these has proven wholly satisfactory.

Seals have been proposed in which gaskets of rubber or the like are employed but at high pressures such gaskets frequently blow out and are unreliable. The sealing action of such gaskets is based on compressing the gasket so that it has a face in frictional and sealing engagement with other faces at the location of sealing. Such gaskets have definite temperature limitations.

It has also heretofore been proposed to use metallic sealing wedges with faces in contact with surfaces of the vessel and of the closure but these require excessive force to bring them to sealed condition, are accordingly difficult to seal and unseal, and still have a tendency to leak.

It has also heretofore been proposed to use sharp edged sealing gaskets of metal interposed between a surface of a vessel and a surface of the closure but with such gaskets there is a tendency to score one or both surfaces so that only a very limited reuse is available. Such close tolerances are required that the machining of such gaskets is exceedingly difficult.

With some of the seals heretofore employed the sealing element was given a permanent deformation or distortion so that only a single use of the sealing element was possible.

It is the principal object of the present invention to provide a seal for pressure vessels which overcomes the objectionable features of prior seals.

It is a further object of the present invention to provide a seal for pressure vessels which is of simple construction and has a highly effective sealing action with ease of sealing and unsealing.

It is a further object of the present invention to provide a seal for pressure vessels with which only a low sealing torque is required.

It is a further object of the present invention to provide a seal for pressure vessels which is self sealing.

It is a further object of the present invention to provide a seal for pressure vessels in which the sealing element is capable of reuse.

Other objects and advantageous features of the invention will be apparent from the description and claims.

The nature and characteristic features of the invention will be more readily understood from the following description, taken in connection with the accompanying drawings forming part thereof, in which:

Figure 1 is a vertical central sectional view of a pressure vessel, closure and sealing ring in accordance with the invention;

Fig. 2 is a horizontal sectional view taken approximately on the line 2—2 of Fig. 1;

Fig. 3 is a fragmentary vertical sectional view, enlarged, showing a preferred form of seal in accordance with the invention;

Fig. 4 is a fragmentary vertical sectional view, enlarged, of another preferred form of seal in accordance with the invention;

Fig. 5 is a fragmentary vertical sectional view, enlarged, of another preferred form of seal in accordance with the invention;

Fig. 6 is a fragmentary vertical sectional view, enlarged, of another preferred form of the invention which is particularly adapted for use with external pressures in excess of the internal pressure; and Fig. 7 is a fragmentary vertical sectional view, enlarged, of another preferred form of the invention which is particularly adapted for the same uses as that shown in Fig. 6.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a hollow cylindrical pressure vessel of steel or the like is shown generally at 10, has a hollow cylindrical side wall 11 of sufficient thickness to withstand the pressures to be accommodated and has an integral end wall 12. The end wall 12, if desired, can have a pressurizing opening 13. At the opposite end of the vessel 10 from the end wall 12 an internally threaded section 15 is provided for engagement by a tightening nut 16. The nut 16 can have transverse openings 17 for the insertion of tightening bars (not shown).

The nut 16 is in engagement with a closure plug 20, preferably of steel, and a shank 21 can extend through a central opening 22 in the nut 16. An interior space 23 is thus provided within the vessel 10.

The structure by which the seal is effected will now be described.

The vessel 10, between the interior space 23 and the threaded section 15, is provided with a frusto-conical surface 25. The vessel 10, if desired, can have a vent groove 26 at its upper terminus with a vent port 27 extending from the groove 26 to the exterior of the vessel 10.

The angle of inclination of the surface 25 can be varied as desired, an angle of the order of 7° from the vertical being quite satisfactory. A greater angle, of the order of 15°, could be employed but would require more effort to tighten the seal and larger angles for the surface 25 would require still more effort to tighten the seal, without compensating advantages.

The closure plug 20 has a downward and inwardly slanted surface 28 which can be in spaced relation to, and out of engagement with, the surface 25, if desired, and has a circumferentially disposed step 29 therebelow. The shape of the step 29 will be referred to in detail below.

A sealing ring 30, to be described, is interposed between the surface of the step 29 and the surface 25. The ring 30 is made as a single uninterrupted or continuous ring of metal, and preferably steel, stainless steel, nickel or the like, so as to be resistant to substantial deformation under compression and corrosion. At the lower part of the step 29 a snap ring groove 29a is provided for the reception of a snap ring 31 for retaining the sealing ring 30 on the closure plug 20 when the closure plug 20 is being inserted in or removed from the vessel 10.

Referring now to Fig. 3 of the drawings, the ring 30 there shown has an outer surface portion 32, curved in transverse cross section, for tangential or line contact around its periphery with the surface 25 and an inner surface portion 33, for tangential or line contact around its periphery with an outer peripheral surface portion 34 of the step 29. The surface portion 34 has a different and larger radius of curvature transversely considered than the surface portion 33 so as the provide the desired tangential or linear contact. The contact line of the surface portions 33 and 34 is preferably disposed with respect to the line of contact of the surface portions 32 and 25 so that a line drawn from the line of contact of the surface portions 33 and 34 and perpendicular to the surface 25 intersects the surface 25 above or outside the line of contact of the surfaces 32 and 25. In this manner there is a component of force applied by the internal pressure tending to wedge the ring 30 and urge the contacting portions of the surfaces 33 and 34 and the contacting portions of the surfaces 32 and 25 into tighter engagement so that the ring 30 is self sealing.

Referring now to Fig. 4, the ring 30 there shown is similar to the ring 30 shown in Fig. 3 but has a slot 35 therein to permit a spring action, expansibility, or self energizing action, due to the internal pressure between the outer and inner exterior surfaces 32 and 33 of the ring 30.

Referring now to Fig. 5, the ring 30 there shown has an additional inner curved surface portion 36 for tangential or line contact with a surface portion 37 of the step 29. The surface portions 34 and 37 have a larger radius of curvature transversely considered than the surface 33 so as to provide the desired tangential or line contact and pursuant to this characteristic can even be flat or nearly flat surfaces, transversely considered.

The seals previously described are particularly adapted for high internal pressures in the vessel 10.

Referring now to Fig. 6, the ring 30 there shown is particularly suited for pressure vessels where the external pressures are in excess of the internal pressure. In this form of the invention the contact line of the surface portions 33 and 34 is disposed with respect to the line of contact of the surface portions 32 and 25 so that a line drawn from the line of contact of the surface portions 33 and 34 and perpendicular to the surface 25 intersects the surface 25 below or inside the line of contact of the surfaces 32 and 25. There is accordingly a component of force applied by the pressure differential with the exterior pressure higher which causes the ring 30 to be self sealing.

In Fig. 7 the ring 30 there shown is similar to that employed for the seal shown in Fig. 5, i. e., with three lines of contact but the relation between the line of contact of the surfaces 33 and 34 and the surfaces 32 and 25 is the same as that shown in Fig. 6, i. e., a perpendicular to the surface 25 from the line of contact between the surfaces 33 and 34 is offset inwardly or below the line of contact of the surfaces 32 and 25.

We claim:

1. A seal for pressure vessels and the like comprising a first metallic member having a continuous curved outwardly flaring frusto-conical surface portion, a second metallic member to be sealed with respect to said first member having a step spaced from said surface portion, said step having a curved surface, a metallic sealing ring interposed between said members for sealing engagement therewith, said ring having an outer curved peripheral surface in linear engagement with said surface portion and an inner curved surface in linear engagement with the surface of said step, and members for urging said second member towards said first member for sealing engagement of said ring, said ring in sealing position being so located with respect to said frusto-conical surface portion and said curved surface of said step that a perpendicular to said surface portion from the location of engagement of said inner curved surface intersects said surface portion to one side of the location of engagement of said outer curved surface with said frusto-conical surface portion.

2. A seal as defined in claim 1 in which the surface of said step contiguous to the location of engagement of said inner curved surface has a greater transverse radius of curvature.

3. A seal as defined in claim 1 in which said ring has an additional surface portion in linear engagement with the surface of said step.

4. A seal as defined in claim 1 in which said ring is expansible in cross section.

5. A seal as defined in claim 1 in which said second member has a retainer thereon for preventing separation of said ring from said member.

6. In combination, a metallic pressure vessel having an end opening with an outwardly flaring frusto-conical surface portion therearound, a metallic closure member for said end opening having a peripheral step with a concavely curved bounding surface in spaced relation inwardly of said surface portion, and a continuous metallic sealing ring interposed between said surface portion and the bounding surface of said step for sealing engagement therewith, said ring having an outer peripheral surface curved in cross section in continuous linear engagement with said surface portion and an inner surface curved in cross section in continuous linear engagement with said bounding surface of said step, and members for positioning said closure member in said end opening with said ring in said linear engagement, said ring in sealing position being so located with respect to said surface portion and said bounding surface that a perpendicular to said surface portion from the location of engagement of said inner curved surface with said bounding surface is offset with respect to the location of engagement of said outer curved surface with said surface portion.

7. The combination defined in claim 6 in which said ring has an additional surface portion in linear engagement with the surface of said step.

8. The combination defined in claim 6 in which said ring is expansible in cross section.

References Cited in the file of this patent

UNITED STATES PATENTS

| | | |
|---|---|---|
| 1,825,962 | Laird | Oct. 6, 1931 |
| 2,226,494 | Jacocks | Dec. 24, 1940 |
| 2,298,511 | Rathbun | Oct. 13, 1942 |
| 2,687,909 | Blackman et al. | Aug. 31, 1954 |